E. D. PUTT.
APPARATUS FOR COVERING TIRE BEADS.
APPLICATION FILED MAY 8, 1919.
1,370,911.    Patented Mar. 8, 1921.
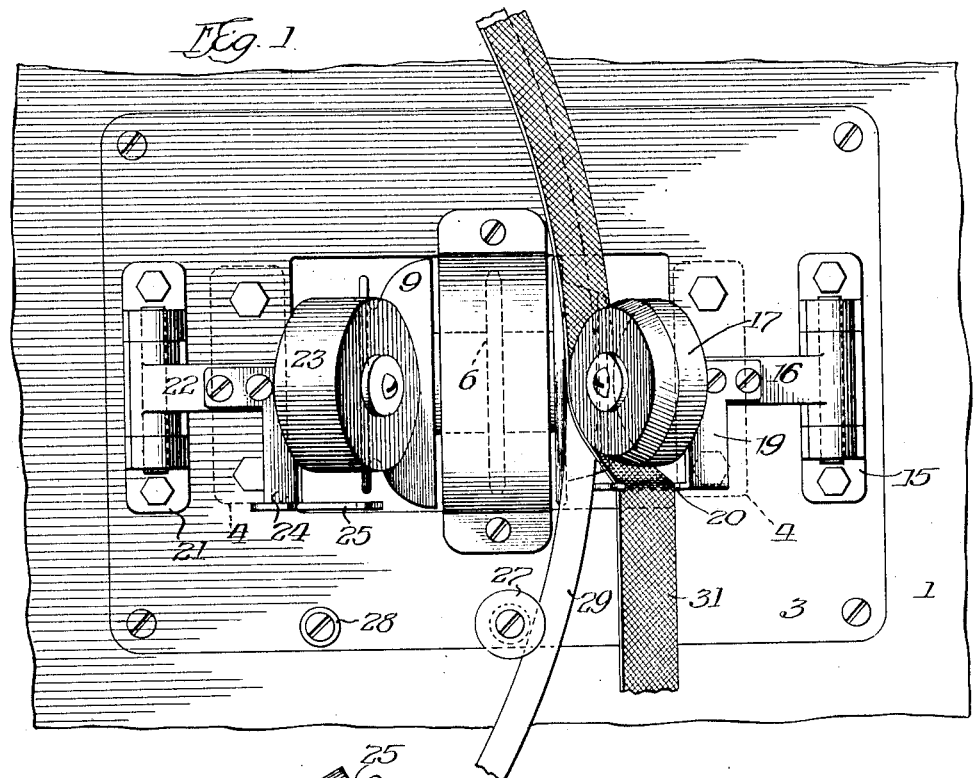
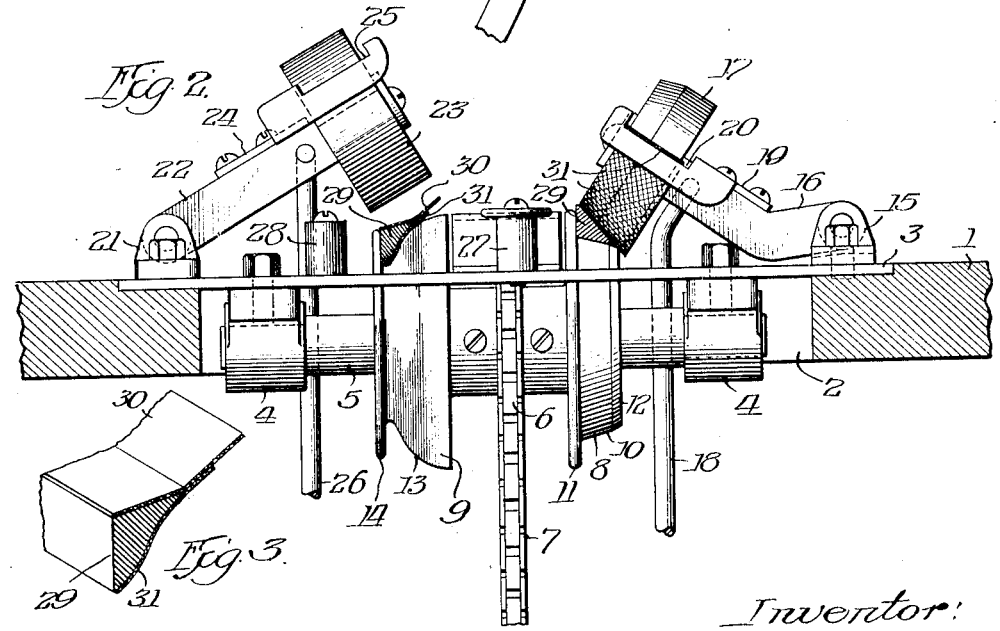

UNITED STATES PATENT OFFICE.

EDWARD D. PUTT, OF AKRON, OHIO, ASSIGNOR TO THE FIRESTONE TIRE AND RUBBER COMPANY, OF AKRON, OHIO, A CORPORATION OF OHIO.

APPARATUS FOR COVERING TIRE-BEADS.

1,370,911.   Specification of Letters Patent.   Patented Mar. 8, 1921.

Application filed May 8, 1919. Serial No. 295,625.

*To all whom it may concern:*

Be it known that I, EDWARD D. PUTT, a citizen of the United States, residing at Akron, in the county of Summit, State of Ohio, have invented certain new and useful Improvements in Apparatus for Covering Tire-Beads, of which the following is a specification.

This machine is designed to apply strips of fabric to the sides of beads prior to their incorporation into the tire carcass and is intended to replace to a large extent the hand operations which are now universally used in the covering of beads. The purpose of this invention is to construct an apparatus which will quickly and accurately apply and cement the covering strips to the side of a bead. It is shown as applying the material to beads of the "straight side" type with bias fabric, but it will be understood that the type of bead and fabric make no essential difference in regard to the machine, and alterations and modifications may be made without sacrificing any of the features of the invention, so that it will cover any type of bead using any style of fabric.

In the drawings:

Figure 1 is a top plan view of the machine.

Fig. 2 is a side elevation.

Fig. 3 is a perspective view of a fragment of a bead which is designed to be covered.

In the embodiment of the invention shown herein 1 represents a table or stand, the top of which is provided with an opening 2 covered by a plate 3. To the under side of the plate, in the opening 2, are secured a pair of alined brackets 4, receiving a rotating shaft 5 driven by means of a sprocket wheel 6, and a sprocket chain 7 from any suitable source of power. Beside the sprocket wheel on the shaft 5 are secured to bead covering rollers 8 and 9 which extend through an opening in the plate. One of the rollers, herein designated by the numeral 8, is formed with a conical surface 10, adapted to fit the straight side of the bead, and a flange 11 which contacts the base of the bead. The outer edge of the roller may be tapered off at a slightly greater angle, as at 12. The roller 9 is formed with a double or O—G curved surface 13 which conforms to the long side of the bead, and a flange 14 against which the base of the bead is guided.

On the side of the plate adjacent the roller 8 is secured a bracket 15 in which is pivotally mounted a lever 16 the outer end of which carries a freely rotatable roller 17. This roller is preferably shaped to conform more or less closely to the curved side of the bead. A rod 18 is connected to this lever and in turn to a foot treadle or other suitable operating device (not shown). Secured to the upper surface of the lever is a plate 19, the end of which extends parallel to the axis of the roller 17 at one side thereof, being formed with a guiding recess 20 of the same width as the covering fabric.

At the side of the plate near the roller 9 is arranged another bracket 21 to which is pivoted a lever 22, at the outer end of which is a freely rotatable roller 23. To the upper surface of this lever is also secured a plate 24, the end of which extends to one side of the roller 22 and parallel to the axis thereof, being provided with a guiding recess 25 of a width equal to the width of the covering strip designed to be applied to the straight side of the bead. A rod 26 is connected to the lever 22 and operates it by a foot treadle or other device not shown.

It will be understood that both of the levers 16 and 22 may be balanced so as to normally stand slightly away from the rollers 8 and 9.

On the front of the plate are carried two rollers 27 and 28 which serve to guide the bead. The bead is shown at 29 and the covering strip on the straight side at 30 and on the curved side at 31.

During the operation of the machine, the shaft 5 and rollers 8 and 9 are constantly driven. The operator lays the circular, uncovered bead 29 on the roller 8, the roller 17 being elevated, and introduces the end of the strip 31 through the guide 20 and under the roller 17. Pressure is then applied to depress the lever 16 and the bead is caused to rotate drawing the fabric 31 and applying it to the curved side of the bead. When the bead has completed its circuit, it is turned over and placed on the roller 9 and the fabric applied to the straight side of the bead in the same manner. By this machine the beads are quickly and accurately covered.

While the description has been detailed, this invention is not so limited, but may be varied without departure within the scope of the claims.

I claim:

1. An apparatus for covering beads, comprising a roller corresponding in profile to two sides of a bead, means for rotating the roller, a lever pivoted adjacent said roller, a second roller on the end of said lever, means for rotating said lever to bring the second roller toward the first named roller, and a guide for directing a strip of covering material between the rollers.

2. An apparatus for covering beads, comprising a roller, a surface of said roller corresponding to one side of the bead, means for rotating the roller, a lever pivoted adjacent said roller, a second roller on the end of said lever, means for rocking said lever, a plate secured to the lever and a guiding formation on said plate to direct a strip of covering material between the rollers.

3. An apparatus for covering beads comprising a rotatable shaft, a pair of rollers on said shaft, a surface on one of said rollers corresponding to one side of the bead, a surface on the other of said rollers corresponding to another side of said bead, a pair of levers pivoted adjacent the rollers, pressure rollers on said levers, means to bring said levers toward said first named rollers, and means to guide fabric onto the bead between the rollers.

4. An apparatus for covering beads, comprising a rotatable shaft, a pair of rollers on said shaft, a surface on one of said rollers corresponding to one side of the bead, a surface on the other of said rollers corresponding to another side of said bead, a pair of levers pivoted adjacent the rollers, pressure rollers on said devices, means to bring said levers toward said first named rollers, and guide plates for fabric secured to said levers.

EDWARD D. PUTT.